US00RE42544E

(19) United States
(12) Reissued Patent
Chao et al.

(10) Patent Number: US RE42,544 E
(45) Date of Reissued Patent: Jul. 12, 2011

(54) GOLF CLUB HEAD

(75) Inventors: Bing-Ling Chao, San Diego, CA (US); Brian Weed, Gloucester, MA (US); Peter Larsen, San Marcos, CA (US); Gery Zimmerman, Fallbrook, CA (US); Benoit Vincent, Encinitas, CA (US)

(73) Assignee: Taylor Made Golf Company, Inc., Carlsbad, CA (US)

(21) Appl. No.: 11/998,435

(22) Filed: Nov. 28, 2007

Related U.S. Patent Documents

Reissue of:
(64) Patent No.: 7,140,974
Issued: Nov. 28, 2006
Appl. No.: 10/831,496
Filed: Apr. 22, 2004

(51) Int. Cl.
*A63B 53/04* (2006.01)
*A63B 53/08* (2006.01)

(52) U.S. Cl. ..... 473/329; 473/342; 473/345; 473/346

(58) Field of Classification Search ..... 473/324–350
See application file for complete search history.

(56) References Cited

U.S. PATENT DOCUMENTS

| | | | | | |
|---|---|---|---|---|---|
| 1,133,129 | A | * | 3/1915 | Govan | 473/337 |
| 3,567,228 | A | * | 3/1971 | Lynn | 473/332 |
| 3,695,618 | A | * | 10/1972 | Woolley et al. | 473/342 |
| 4,804,188 | A | * | 2/1989 | McKee et al. | 473/342 |
| 4,884,812 | A | * | 12/1989 | Nagasaki et al. | 473/342 |
| 5,106,094 | A | * | 4/1992 | Desbiolles et al. | 473/342 |
| 5,261,664 | A | * | 11/1993 | Anderson | 473/342 |
| 5,344,140 | A | * | 9/1994 | Anderson | 473/342 |
| 5,346,216 | A | * | 9/1994 | Aizawa | 473/329 |
| 5,433,440 | A | * | 7/1995 | Lin | 473/342 |
| 5,480,153 | A | * | 1/1996 | Igarashi | 473/345 |
| 5,494,281 | A | * | 2/1996 | Chen | 473/329 |
| 5,505,453 | A | * | 4/1996 | Mack | 473/329 |
| 5,518,242 | A | * | 5/1996 | Mahaffey et al. | 473/342 |
| 5,720,673 | A | * | 2/1998 | Anderson | 473/342 |
| 5,774,970 | A | * | 7/1998 | Huang | 29/447 |

(Continued)

FOREIGN PATENT DOCUMENTS

GB 2 338 903 A 1/2000

(Continued)

OTHER PUBLICATIONS

Japanese Office action (English translation), Japanese App. No. 2005-123040, filed Apr. 21, 2005, 3pp. (Aug. 3, 2010).

*Primary Examiner* — Sebastiano Passaniti
(74) *Attorney, Agent, or Firm* — Klarquist Sparkman, LLP

(57) ABSTRACT

A golf club head has a body having a top, a sole, a toe end, a heel end, and a forward wall. The forward wall defines a front opening about which a face support is disposed. The face support receives a face plate, thereby enclosing the front opening of the body. The face support includes portions proximate to the top, the toe end, and the heel end, each portion having a peripheral member extending rearward from the forward wall and a rear member extending inward from the peripheral member, with respect to the front opening. The face support can be combined with a preferred face construction and weight elements to optimize club head performance to help a golfer achieve greater distance and control.

35 Claims, 8 Drawing Sheets

U.S. PATENT DOCUMENTS

| | | | | | |
|---|---|---|---|---|---|
| 5,830,084 | A | * | 11/1998 | Kosmatka | 473/349 |
| 5,906,550 | A | * | 5/1999 | Kingston | 473/320 |
| 5,993,329 | A | * | 11/1999 | Shieh | 473/329 |
| 6,050,904 | A | * | 4/2000 | Kuo | 473/342 |
| 6,162,133 | A | * | 12/2000 | Peterson | 473/345 |
| 6,193,614 | B1 | * | 2/2001 | Sasamoto et al. | 473/329 |
| 6,248,025 | B1 | * | 6/2001 | Murphy et al. | 473/324 |
| 6,364,789 | B1 | * | 4/2002 | Kosmatka | 473/329 |
| 6,390,932 | B1 | * | 5/2002 | Kosmatka et al. | 473/324 |
| 6,440,011 | B1 | * | 8/2002 | Hocknell et al. | 473/342 |
| 6,582,323 | B2 | * | 6/2003 | Soracco et al. | 473/342 |
| 6,607,451 | B2 | * | 8/2003 | Kosmatka et al. | 473/329 |
| 6,648,774 | B1 | * | 11/2003 | Lee | 473/342 |
| 6,669,576 | B1 | * | 12/2003 | Rice | 473/305 |
| 6,669,577 | B1 | * | 12/2003 | Hocknell et al. | 473/329 |
| 7,004,852 | B2 | * | 2/2006 | Billings | 473/332 |
| 7,357,730 | B2 | * | 4/2008 | Shieh | 473/342 |
| 2001/0055995 | A1 | * | 12/2001 | Cackett et al. | 473/342 |
| 2002/0065146 | A1 | * | 5/2002 | Kusumoto | 473/345 |
| 2003/0036442 | A1 | * | 2/2003 | Chao et al. | 473/345 |
| 2003/0139227 | A1 | * | 7/2003 | Sugimoto | 473/342 |
| 2005/0026718 | A1 | * | 2/2005 | Chen | 473/342 |

FOREIGN PATENT DOCUMENTS

| | | | |
|---|---|---|---|
| GB | 2338903 | * | 1/2000 |
| JP | U-H05-068564 | | 9/1993 |
| JP | 09-299519 | * | 11/1997 |
| JP | 10-155943 | * | 6/1998 |
| JP | 2002315854 | * | 10/2002 |
| JP | T-2003-518993 | | 6/2003 |

* cited by examiner

GOLF CLUB HEAD

Matter enclosed in heavy brackets [ ] appears in the original patent but forms no part of this reissue specification; matter printed in italics indicates the additions made by reissue.

BACKGROUND OF THE INVENTION

The present invention relates generally to golf clubs and, more particularly, to an golf club head having an improved face plate support.

Many factors must be considered when designing a golf club head. One factor is the distribution of mass about the club head, which is typically quantified by parameters such as moments of inertia (MOI) magnitude and center of gravity (CG) location. Rotational moments of inertia of a club head about the club head CG are measures of a club head's resistance to rotation about the CG and are related to the distribution of mass within the club head about the CG. It is desirable for a club head to have high moments of inertia about the CG, particularly to promote forgiveness for off-center hits. To achieve high moments of inertia about the CG, designers typically position mass to the periphery of the golf club head and backwards from the face plate. In addition, a club head's CG is spaced from the face plate at a prescribed location to achieve a desired launch angle upon impact with a golf ball. As a result, for wood-type club heads (i.e., fairway woods and drivers), large internal volumes are typically desirable.

Another factor in club head design is the face plate of the club head. Upon impact with a golf ball, the face plate of a club head deflects and rebounds, thereby imparting energy to the struck golf ball. The club head's coefficient of restitution (COR) is the ratio of the difference between the ball speed after impact and the club speed after impact and the club speed before impact. A thin face plate generally will deflect more than a thick face plate. Thus, a properly constructed club with a thin, flexible face plate can impart a higher initial velocity to a golf ball than a club with a thick, rigid face plate. In order to maximize the MOI about the CG and achieve a high COR, it typically is desirable to incorporate thin walls and a thin face plate into the design of the club head. Thin walls afford the designers additional leeway in distributing club head mass to achieve desired mass distribution, and a thin face plate may provide for a high COR.

Thus, thin walls are important to a club's performance. However, overly thin walls can adversely affect the club head's durability. Problems also arise from stresses distributed across the club head upon impact with the golf ball, particularly at junctions of club head components, such as the junction of the face plate with other club head components (e.g., the sole, skirt, and crown). One prior solution has been to provide a reinforced periphery about the face plate, such as welding, in order to withstand the repeated impacts. Another approach to combat stresses at impact is to use one or more ribs extending substantially from the crown to the sole vertically, and in some instances extending from the toe to the heel horizontally, across an inner surface of the face plate. These approaches tend to adversely affect club performance characteristics, e.g., diminishing the size of the sweet sport, and/or inhibiting design flexibility in both mass distribution and the face structure of the club head. Thus, these club heads fail to provide optimal MOI, CG, and/or COR parameters, and as a result, fail to provide much forgiveness for off-center hits for all but the most expert golfers.

It should, therefore, be appreciated that there exists a need for a golf club head having a face plate support that facilitates performance and durability. The present invention fulfills this need and others.

SUMMARY OF THE INVENTION

Briefly, and in general terms, the present invention provides a golf club head having enhanced durability and performance characteristics. The club head includes a face plate and a body having a face plate support for receiving the face plate. The body includes a top, a toe end and a heel end, a sole, and a forward wall. The forward wall defines a front opening about which the face plate support is disposed. The face plate support receives the face plate, thereby enclosing the front opening of the body.

More specifically, and by way of example, the face plate support is configured to enhance the durability and performance of the club head. The face plate support includes portions proximate to the crown, the toe end, and the heel end. Each of these face plate support portions includes a peripheral member extending rearward from the forward wall and a rear member extending inward from the peripheral member, with respect to the front opening. The face plate support can also include a portion proximate to the sole of the body. The face plate support contributes to increased COR even about the periphery of the face plate while providing durable support. Thus, the face plate can be designed with an emphasis or performance. For example, the face plate can be configured with a face thickness variation that provides a maximum COR over a larger face area than otherwise possible. Preferably, the face plate is formed from composite material; however, a lightweight metal face plate may alternatively be attached to a metal body of the club head. In addition, in an exemplary embodiment, a junction of the peripheral and tear members of the face plate support has a maximum thickness of between about 1.5 and 2 mm.

For purposes of summarizing the invention and the advantages achieved over the prior art, certain advantages of the invention have been described herein above. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

Figure 1:
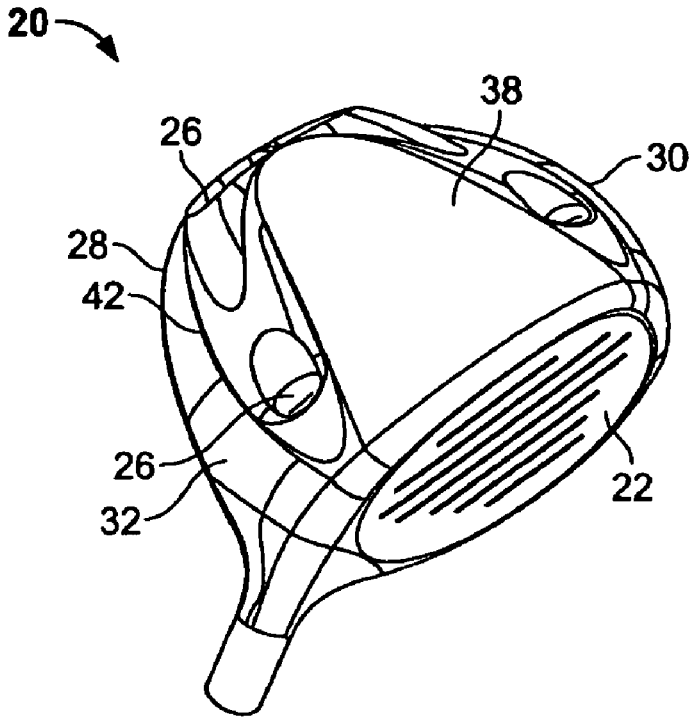
FIG. 1 is a bottom perspective view of a first embodiment of a golf club head in accordance with the present invention, depicting a body and a face plate.

The drawings include preferred embodiments of golf club heads in accordance with the present invention. With reference to FIGS. 1-4, a wood-type club head 20 is shown having a separate face plate 22 and a body 24. The body 24 and the face plate 22 are relatively light, thereby facilitating the use of four removable weights 26 disposed about the periphery of the club head 20, including two weights in a rear region 28 of the body 24, one weight in a toe region 30 of the body, and one weight in a heel region 32 of the body. The body 24 includes a face plate support 34 disposed about a front opening 36 of the body for receiving the face plate 22. The face plate support 34 provides durable support for the face plate 22 while contributing to enhanced club performance, such as a high COR even about the periphery of the face plate. More particularly, upon impact with a golf ball, the face plate support 34 promotes accommodates deflection of the face plate 22 even about the periphery thereof.

Figure 7:
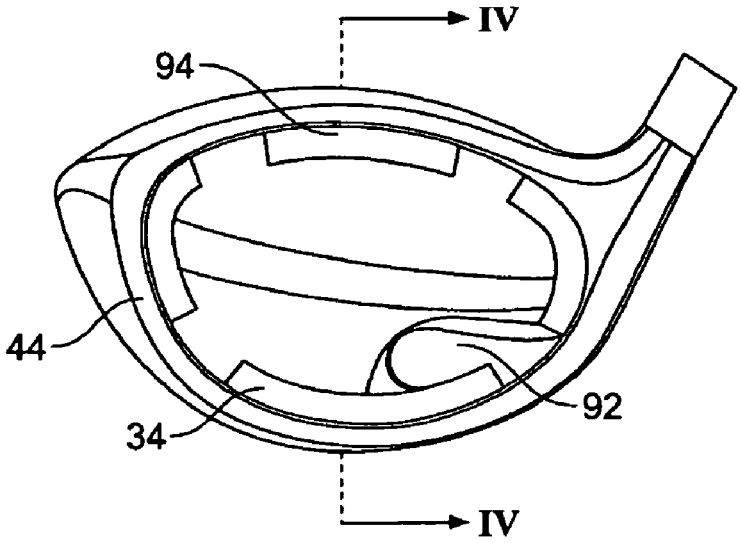
FIG. 7 is a front elevational view of a second embodiment of a body for a golf club head in accordance with the present invention, depicting a face plate support having a plurality of tabs about a front opening of the body.
Figure 8:
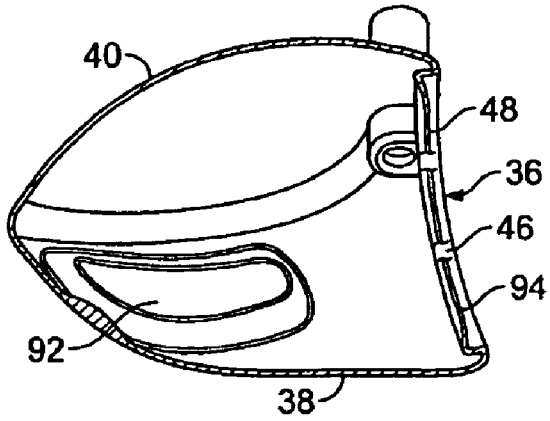
FIG. 8 is a cross-sectional view taken along line IV-IV of FIG. 7.

The body 24 includes a sole 38, a top (i.e., crown 40), a skirt 42, and a forward wall 44. The face plate support 34 includes a peripheral member 46 extending rearward from the forward wall 44 and a rear member 48 extending inward with reference to the front opening 36. The face plate support 34 includes portions proximate to the crown 40, the toe 30, the heel 32 and the sole 38. More particularly, in the exemplary embodiment, the face plate support 34 is continuous about the front opening 36. In other embodiments, portions of the face plate support 34 can be configured as a plurality of tabs spaced apart about the front opening 36. One such example is depicted in FIGS. 7 and 8 and is discussed in further detail below. Also, in other embodiments (e.g., FIGS. 13 and 14), the portion of the face plate support 34 proximate to the sole 38 may not include a thin peripheral member 46.

Figure 2:
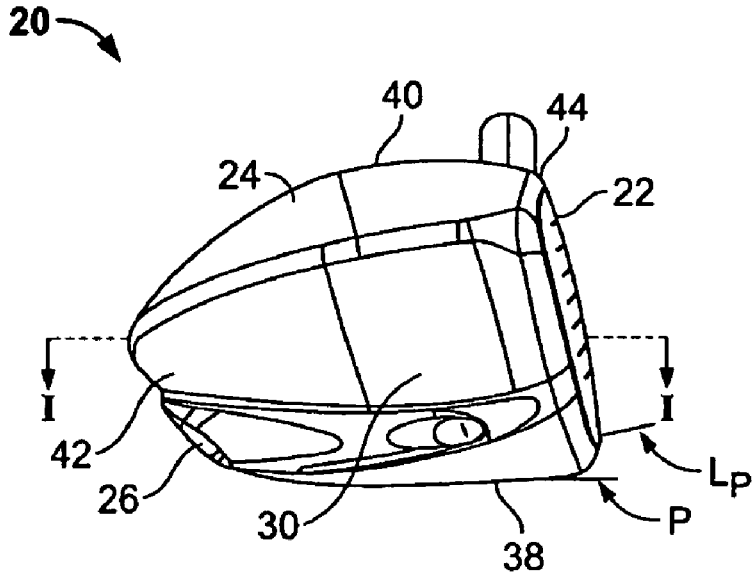
FIG. 2 is a toe-side elevational view of the golf club head of FIG. 1.

With reference to FIGS. 1-4, the face plate support 34 is recessed relative to the forward wall 44 allowing the face plate 22 to sit flush with the forward wall 44 of the body 24. In the portions of the face plate support 34 proximate to the crown 40 and sole 38, the peripheral member 46 is generally perpendicular to a face plane (V) (i.e., a plane tangent to a point at the geometric center of the face plate striking surface), and the rear member 48 is generally parallel to the face plane (V). As best seen in FIG. 2, a loft plane (LP) of the club head is normal to the face plane (V) and forms an acute angle with a horizontal ground plane (P) when the club head 20 is at address position. Adjacent the toe and heel ends 30, 32, of the skirt 42 the peripheral member 46 is generally parallel to the face plane (V).

Figure 5:
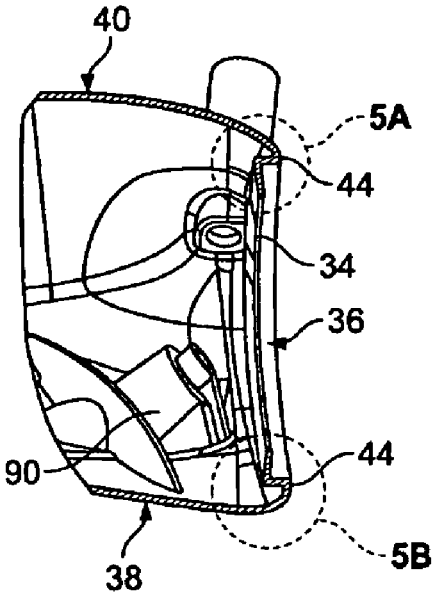
FIG. 5 is a partial cross-sectional view, taken along line II-II of FIG. 4.
Figure 5A:
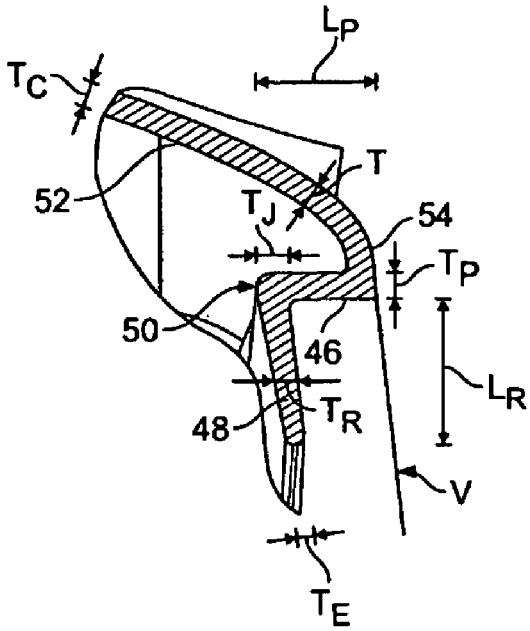
FIG. 5A is a detailed view at section A of FIG. 5, depicting a portion of the face plate support adjacent to the crown of the club head.
Figure 6:
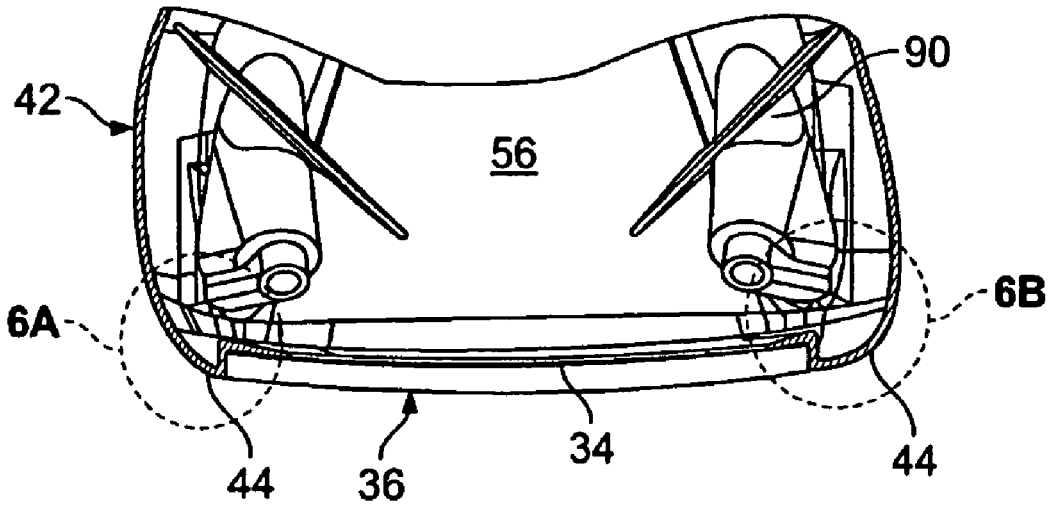
FIG. 6 is a partial cross-sectional view, taken viewed along line III-III of FIG. 4.
Figure 6A:
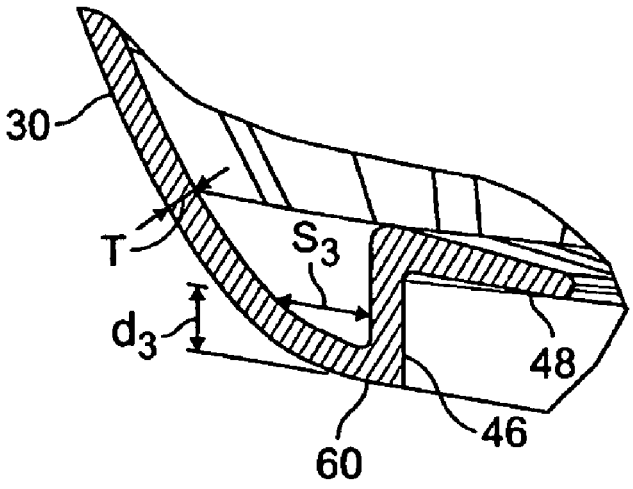
FIG. 6A is a detailed view at section A of FIG. 6, depicting a portion of the face plate support adjacent to the toe end of the club head.
Figure 6B:
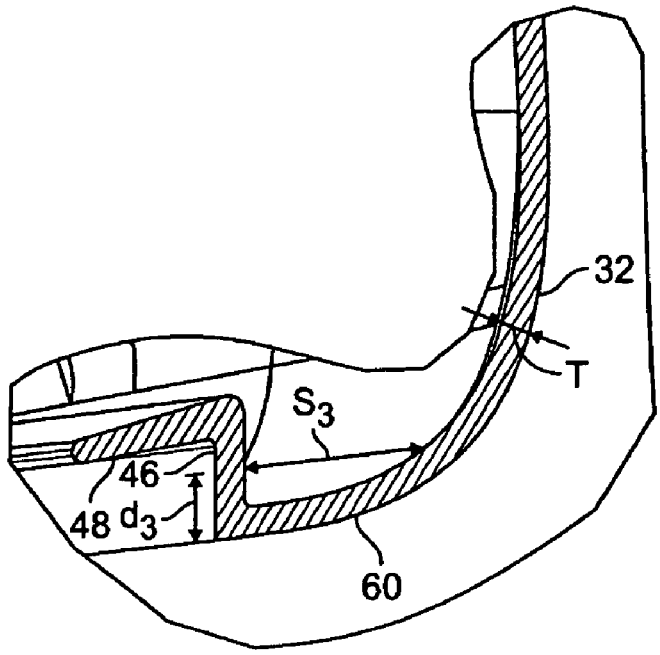
FIG. 6B is a cross-sectional view at section B of FIG. 6, depicting a portion of the face plate support adjacent to the heel end of the club head.

With reference now to FIG. 5 through FIG. 6B, the face plate support 34 is configured to provide durable support while facilitating club performance. More particularly, the face plate support 34 is sufficiently thin to promote a high COR, even about the periphery of the face plate 22, and is structured to provide ample surface area for receiving the face plate, thereby enhancing club head durability. The rear member 48 of the face plate support 34 has a thickness $T_R$ between about 0.5 mm and 2.5 mm and a length $L_R$ between about 2 mm and 25 mm. The dimensions of the face plate support 34 can vary in other embodiments of the invention. For example, the dimensions of the face plate support 34 can vary depending upon the materials used to form the club head 20, head volume, and face plate dimensions. Preferably, the thickness $T_R$ is between about 0.6 mm and 1.5 mm and the length $L_R$ is between about 2 mm and 15 mm, and most preferably the length $L_R$ is between about 2 mm and 7 mm. The peripheral member 46 of the face plate support 34 has a thickness $T_P$ between about 0.5 mm and 2.5 mm and a length $L_P$ between about 3 mm and 30 mm. Preferably, the thickness $T_P$ is between about 0.8 mm and 1.2 mm, and more preferably, the thickness $T_P$ is about 1 mm. The peripheral member 46 preferably has a length $L_P$ between about 4 mm and 6 mm. While the peripheral member 46 most preferably is substantially constant in thickness, the rear member 48 preferably tapers inwardly toward a center of the front opening 36. At an inner end of the rear member 48, the thickness $T_E$ is between about 0.6 mm and 0.9 mm.

At a junction 50 of the peripheral and rear members 46, 48 of the face plate support 34, there is preferably a maximum thickness $T_J$ between about 1.5 mm and 2 mm. In the preferred embodiment of FIGS. 1-6, the peripheral member 46 is spaced from an inner surface 52 of the crown 40 by a distance $S_1$ measured in a vertical direction at a distance $d_1$ rearward from an upper forward wall 54 of the body 24 proximal the front opening 36; this is more clearly shown in FIG. 11. Distance $S_1$ is at least 1 mm and distance $d_1$ is about 2 mm. Similarly, the peripheral member 46 is spaced from an inner surface 56 of the sole 38 a vertical distance $S_2$ measured at a distance $d_2$ rearward from a lower forward wall 58 of the body 24 proximal the front opening 36. Distance $S_2$ is at least 1 mm and distance $d_2$ is about 2 mm. Preferably, the peripheral member 46 is spaced from the crown 40 and sole 38 at least 1.5 mm measured in a vertical direction.

Referencing FIG. 6, at the toe and heel ends 30, 32 the skirt 42, the peripheral member 46 is spaced from an inner surface of the body 24 by a distance $S_3$ measured in a horizontal direction at a distance $d_3$ rearward from a side forward wall 60 of the body 24 proximal the front opening 36. Distance $S_3$ is at least 1.5 mm and distance $d_3$ is about 2 mm. Preferably, distance $S_3$ is at least 2 mm.

Figure 5B:
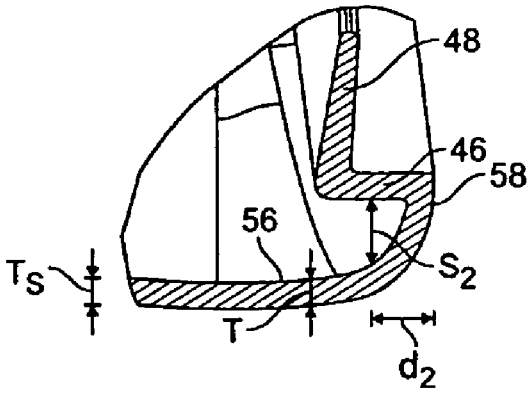
FIG. 5B is a detailed view at section B of FIG. 5, depicting a portion of the face plate support adjacent to the sole of the club head.
Figure 9:
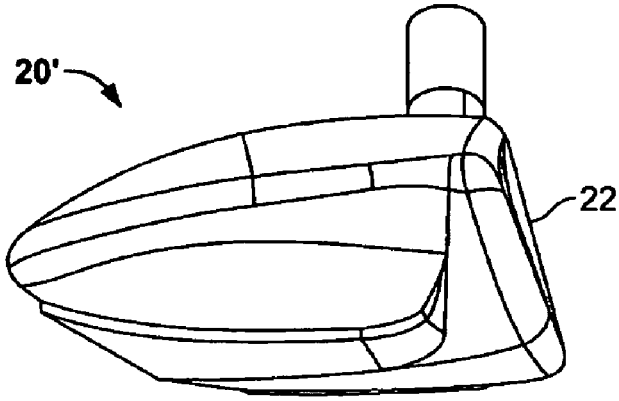
FIG. 9 is a toe-side elevational view of a third embodiment of a club head in accordance with the present invention.
Figure 10:
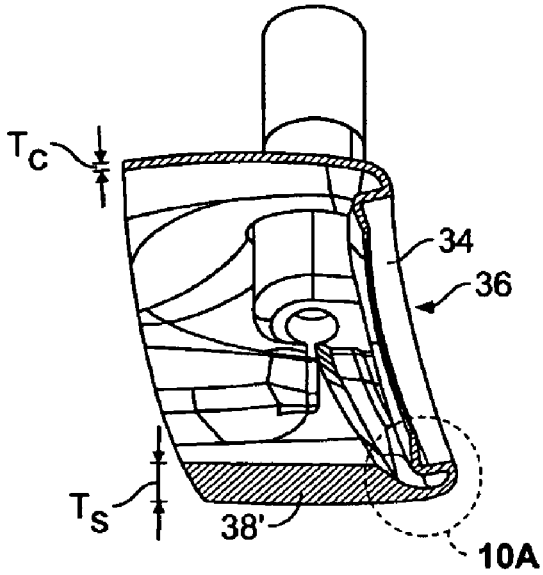
FIG. 10 is a partial cross-sectional view of the body of the club head of FIG. 9, depicting a recessed face plate support about a front opening of the body.
Figure 10A:
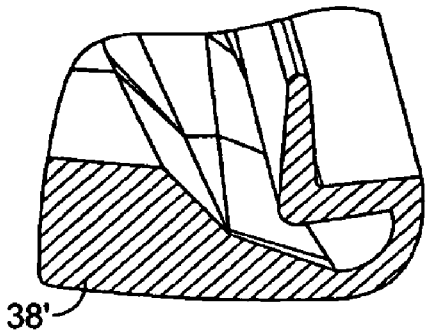
FIG. 10A is a cross-sectional view at section A of FIG. 10, depicting a portion of the face plate support adjacent to the sole of the club head.

Preferred dimensions for the body 24 of the golf club head 20 of FIG. 1 are in the range of 0.7 mm to 1 mm for the crown thickness $T_C$ and in the range of 0.8 mm to 1.2 mm for the sole and the skirt thickness $T_S$. Referencing FIG. 5B, the wall thickness T of the wall that transitions from the crown 40, sole 38, toe 30, and heel 32 to the forward wall 44 and the front opening 36 is preferably about 1 mm. This results in a smoother transition to the thickness $T_P$ of the peripheral member 46 of the face plate support 34. Of course, for golf club heads having smaller volumes the desirable dimensions for the club head may vary. For example, fairway wood club heads 10' having a club head volume in the range of about 130 cc to 190 cc may have substantially thicker soles 38', as shown in FIGS. 9, 10 and 10A.

Figure 13:
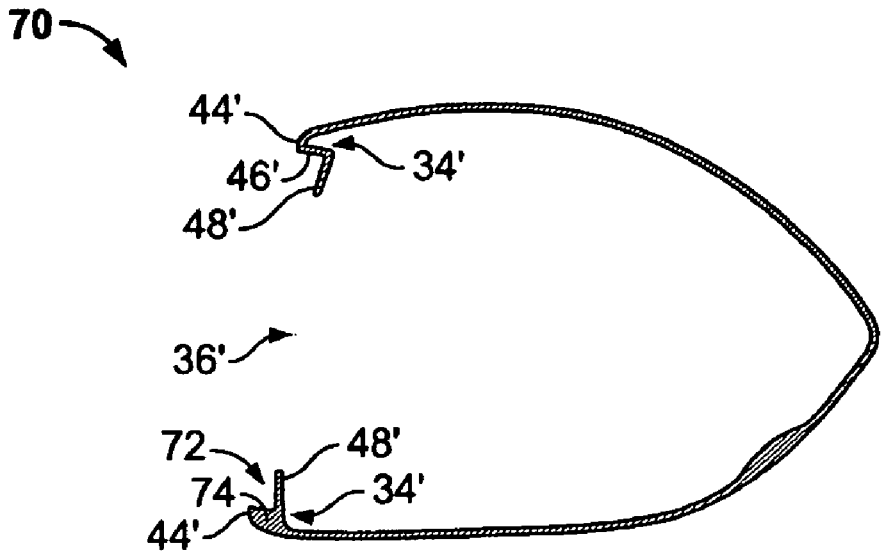
FIG. 13 is a cross-sectional view of a fourth embodiment of a body for a wood-type golf club head in accordance with the present invention, depicting a face plate support of the body having a portion, including a rear member, adjacent to the sole.

With reference now to FIG. 13, a body 70 is depicted for use in a wood-type golf club head. For convenience of reference, like components are given like reference numerals. The body 70 includes a face plate support 34' continuous about a front opening 36'. In the present embodiment, the face plate support 34' includes a lower portion 72 adjacent to a sole 38 of the body 70. The lower portion 72 includes a rear member 48' extending from a lower lip 74 of the body 70 and having dimensions similar to those discussed above. The rear member 48' extends inward with respect to the front opening 36' and is recessed to allow a face plate (not shown) to sit flush with the body 70. In the present embodiment, the entirety of the lower portion 72 of the face plate support 34' excludes a thin peripheral member. However, in other embodiments, the lower portion 72 can include a thin peripheral member only at prescribed locations along the lower portion. Although the present embodiment is for use in a wood-type club head, similar face plate support configurations in which the face plate support does not include a thin peripheral member at prescribed locations, can also be used for other club heads, such as in iron-type club heads (e.g., one-irons through wedges). Moreover, other embodiments of club heads can incorporate a face plate support comprising a plurality of tabs in which selected tabs adjacent to the sole 38 do not include a thin peripheral member, as discussed above.

Figure 14:
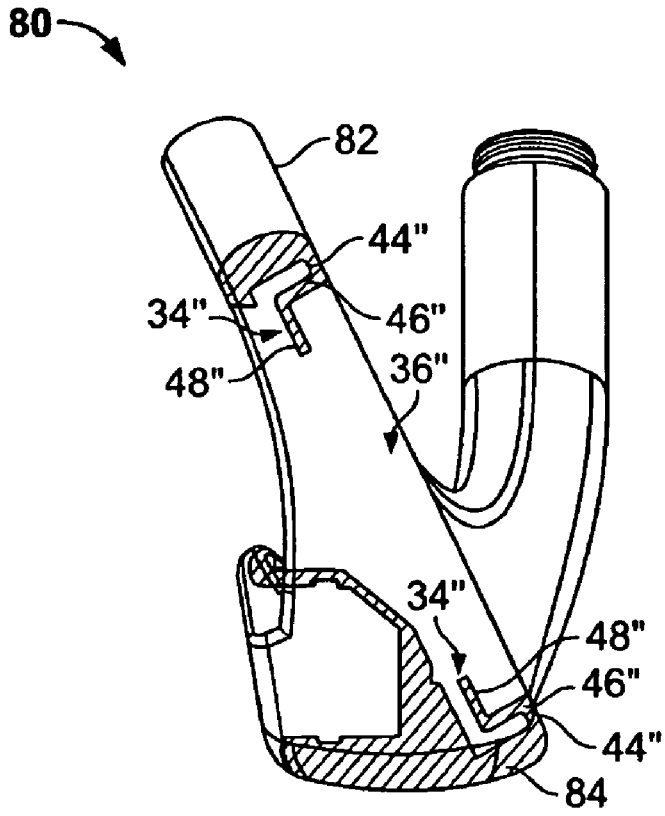
FIG. 14 is a cross-sectional view of a fifth embodiment of a body for an iron golf club head in accordance with the present invention, depicting a face plate support of the body disposed about a front opening.

With reference now to FIG. 14, a body 80 is depicted for use in an iron-type golf club head. The body 80 includes a top 82, sole 84, a toe end, a heel end, and a face plate support 34" similar to face plate supports 34 and 34' described in the previous exemplary embodiments. The face plate support 34" includes a peripheral member 46" extending rearward from a forward wall 44" and a rear member 48" extending inward with reference to the front opening 36". The face plate support 34 is sufficiently thin to promote performance (i.e., higher COR about a peripheral portion of the face plate), and is structured to facilitate club durability. The dimensions for the peripheral and rear members 46", 48" (e.g., thickness and length) are similar to those discussed above. In the exemplary embodiment, the face plate support 34 is continuous about the front opening 36. In other embodiments, the face plate support 34 can be configured as a plurality of tabs spaced apart about the front opening 36.

With reference again to FIGS. 1-4, the club head 20 has four removable weights 26. Two weights are located in the rear region 28 of the club head 20. A third weight is located in the toe region 30 of the club head 20, and a fourth weight is located in the heel region 32 of the club head. The weights 26 are accessible from the exterior of the club head 20 and securely received into recesses 90. In the exemplary embodiment, each weight 26 is oriented such that a longitudinal axis defined by each weight is directed toward the face plate 22. Fewer, such as two or three weights, or more than four weights may be provided as desired.

Figure 3:
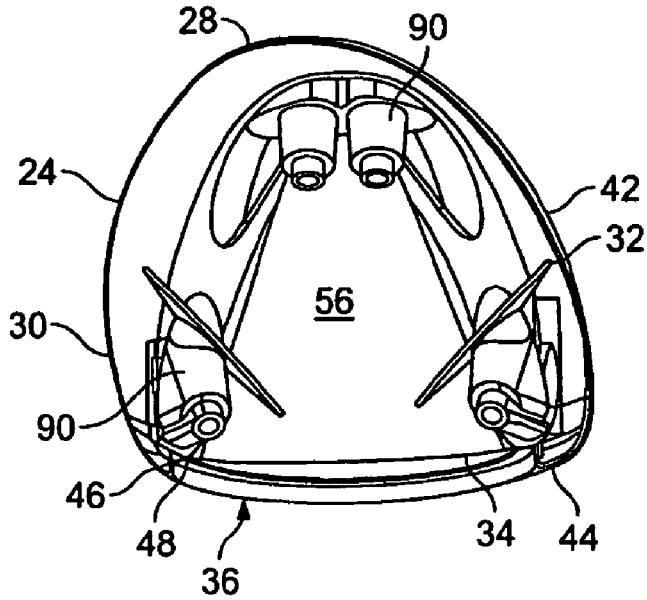
FIG. 3 is a cross-sectional view, taken along line I-I of FIG. 2, depicting the club head with the face plate removed.
Figure 4:
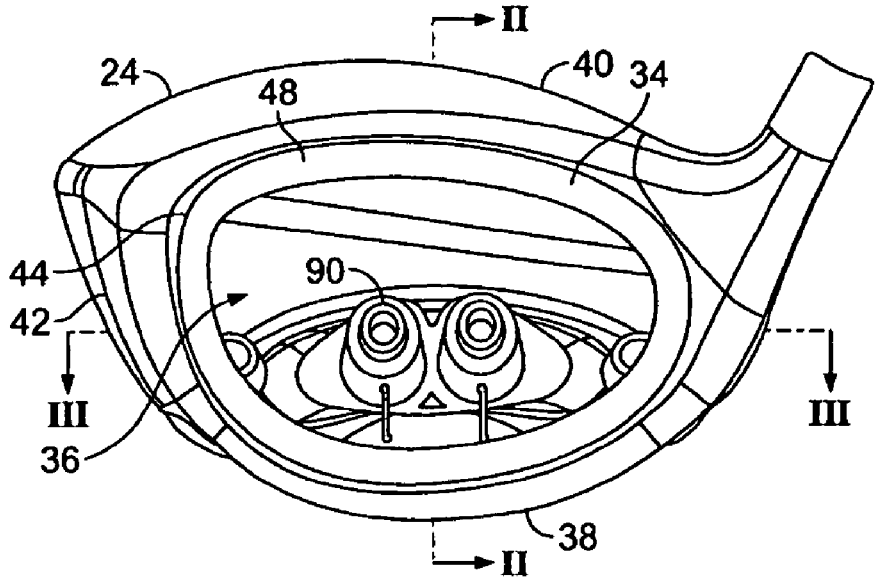
FIG. 4 is a front elevational view of the body of the club head of FIG. 1, depicting a recessed face plate support about a front opening of the body.

Various weight configurations may be used, such as those disclosed in co-pending U.S. patent applications Ser. Nos. 10/290,817 and 10/785,692, which are incorporated herein by reference. In the exemplary embodiment, the weights 26 are attached by screws, such as those available from Textron, Inc., under the brand names TORX® or TORX PLUS®. Screws, such as those available from Textron, Inc., under the brand name CAMCAR®, can be used as one or more of the weights. In the exemplary embodiment, four weights 26 having a combined mass of about 23 g are provided as shown in FIG. 3, wherein the volume of the club head is about 460 cc. A total mass of the club head 20, including a face plate mass of about 24 g, is about 199 g. With this arrangement, the magnitude of a moment of inertia about a vertical axis at a center of gravity of the club head, $I_{ZZ}$, is about 405 kg-mm$^2$.

With continued reference to FIGS. 1-4, the body 24 for the club head 20 comprises cast titanium alloy. In other embodiments, other metal or non-metallic materials may be used, for example, the body can be formed of materials such as squeeze-cast magnesium alloy, steel, and combination of magnesium and titanium alloys. Also, a multi-piece body may be used including one or more different materials. For example, a body may be provided with a sole, skirt, partial crown and face opening formed by metal casting methods known to those skilled in the art. A stamped metal or composite crown may be included to complete the crown of the body and a forged metal or composite face plate may be attached to form the club head 20. Alternatively, a composite body may be provided.

A hollow club head having features of the present invention can range in volume from about 130 cc to about 460 cc. Preferably, the head has a volume of at least 360 cc and more preferably at least 400 cc. The removable weights preferably comprise a mass of between about 20 g and 30 g., for a total head weight between about 180 g to 205 g. The moment of inertia $I_{ZZ}$ is preferably at least 300 kg-mm$^2$ for the present invention and more preferably is at least 350 kg-mm$^2$.

The club head may be formed by casting techniques known to those skilled in the art, preferably by investment casting a titanium alloy such as Ti-6Al-4V. Alternatively, a soluble wax core may be used to create the specific internal structures (e.g., face plate support, weight recess) to achieve the desired club head MOI and CG location parameters. In particular, a separate wax mold may be created for the recesses for the weights 26 that is then attached to a main wax mold for the club head body 24, such as by gluing the two wax molds. In the exemplary embodiment, the forward, heel and toe recesses 90 are formed as part of a unitary head body 24. Alternatively, the weight recesses 90 may be separately formed and welded to an internal location of the club head body 24. Of course, alternative embodiments of the present invention may include integral, thickened wall portions 92, such as shown in FIGS. 7 and 8, in lieu of removable weights 26. Alternative embodiments may omit distinct weight elements completely.

Figure 11:
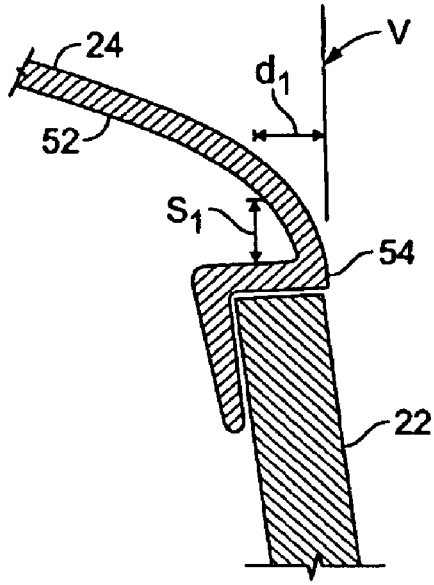
FIG. 11 is a cross-sectional view similar to FIG. 5A, depicting a composite face plate secured to the face plate support of the body.

In several exemplary embodiments, the face plate 22 is formed of composite material; nonetheless, a lightweight metal face plate 22 can also be used. Referring now to FIG. 11, the plies (layers) of composite material (prepreg) comprising the composite face plate 22 can be defined according to the combination of fiber, resin system, fiber area weight (FAW) and resin content (R/C) used. One example of a preferred prepreg is 70 g FAW 34/700 material which comprises 34/700 fiber, Newport 301 resin, 70 g/m$^2$ FAW and 40% R/C. Various embodiments of suitable composite face plates, and methods of manufacture, are disclosed in co-pending U.S. patent application Ser. No. 10/442,348 filed May 21, 2003 and titled GOLF CLUB HEAD AND METHOD OF MANUFACTURE, which is incorporated herein by reference.

The composite face plate 22 can be manufactured by stacking and cutting the plies in predetermined orientations. This may be done in smaller groups of plies that are eventually stacked to form the final thickness of the face plate 22. More particularly, the plies of prepreg can be arranged in specific groups in which each ply has a predetermined orientation with reference to a horizontal axis. For example, a first or outermost ply may comprise 1080 glass fabric oriented at 0 degrees, followed by 48 plies of 34/700 prepreg oriented such that 12 plies each are at 0, +45, 90 and −45 degrees. Another ply of 34/700 at 90 degrees precedes the final or innermost ply of 1080 glass fabric oriented at 0 degrees.

The face plate 22 preferably achieves its final desired shape or dimensions by die cutting. The final desired bulge and roll of the face plate 22 may be achieved during the last of two or more "debulking" or compaction steps of two minutes each to reduce air trapped between plies. Preferably a third debulking step includes forming a panel having the final desired bulge and roll, and more preferably an additional fourth debulking step is provided to form the panel to a final face thickness, where the duration of the fourth debulking step is about three minutes. The weight and thickness of the resulting panel are preferably measured prior to the curing step.

Preferably, the composite golf club face comprises low fiber area weight (FAW) materials, and has a thickness less than about 4 mm. The weight savings from the use of the composite face is about 20 g to 25 g compared to a 2.7 mm thick face plate formed from a titanium alloy such as Ti-6Al-4V, for example. For fairway wood golf club heads, the face plate is preferably at least 60 mm wide and 25 mm high. For driver-type golf club heads, the face plate is preferably at least 80 mm wide and 50 mm high.

Attaching a composite material face plate 22 to a metallic club head body 24 may be accomplished with adhesives. In order to prevent peel and delamination failure at the face-body junction, the composite face plate 22 should be recessed from or substantially flush with the plane of the forward surface of the metal body 24 at the junction, as shown in FIG. 11. Preferably, the composite face plate 22 is sufficiently recessed so that the ends of the fibers are not exposed. The junction of the composite face plate 22 and the metal body 24 preferably includes an annular ledge as the face support 34. Alternatively, the face plate support 34 may comprise two or more sections 94 (FIGS. 7-8) or a plurality of tabs, to support and attach the face plate.

Figure 12:
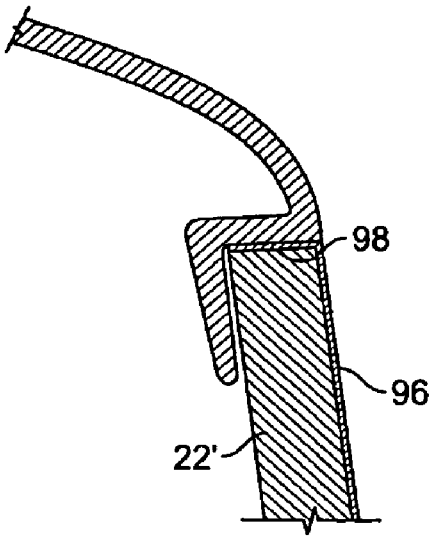
FIG. 12 is a cross-sectional view similar to FIG. 11, depicting a composite face plate having a metal cap at an outer surface.

In a preferred embodiment shown in FIG. 12, the face plate comprises a titanium cap 96 placed over a composite portion 22' to form the striking surface of the face plate. Preferably, the titanium cap includes a peripheral rim 98 to cover the periphery of the composite portion 22', wherein the rim may be continuous or comprise a plurality of segments. The titanium cap thickness is less than about 1 mm, and preferably, the titanium cap thickness is less than 0.2 mm. The cap in one test sample was formed from Ti-6Al-4V titanium alloy; however, other materials or titanium alloys may be employed as desired. The thickness of the composite portion 22' of the face plate is about 3.65 mm and the titanium cap thickness is about 0.3 mm. Also preferably, a bond gap of about 0.05 mm to 0.2 mm, and more preferably about 0.1 mm, is provided between the titanium cap 96 and the composite portion 22' for adhesive attachment of the titanium cap over the composite portion. In other embodiments, a composite portion 22' can be provided without a titanium cap, in which case a front surface of the composite portion 22' may comprise the striking surface of the face plate.

A surface roughness can be provided to the composite face plate 22 to facilitate adhesive bonding. In a first approach, a layer of textured film may be placed on the composite material before curing, thereby forming a given surface roughness on the cured composite material. An example of such a textured film is ordinary nylon fabric. Curing conditions do not degrade the fabric, and an imprint of the fabric texture is transferred to a surface of the composite material. Tests have shown that adhesion of urethane and epoxy, such as 3M® DP460, to the textured composite surface was greatly improved and superior to adhesion to a metallic surface, such as cast titanium alloy. In a second approach, the texture can be incorporated into a mold surface, allowing the textured area to be controlled precisely. For example, in an embodiment having a composite face plate joined to a cast body, the texture can be located on surfaces of the composite face plate where shear and peel are dominant failure modes.

It should be appreciated from the foregoing that the present invention provides a golf club head that includes a face plate and a body having a top, a sole, a toe end, a heel end, and a forward wall. The forward wall defines a front opening about which a face support is disposed. The face support receives the face plate, thereby enclosing the front opening of the body. A face plate is received in a face support provided at the front opening. The face support includes portions proximate to the top, the toe end, and the heel end. Each portion of the face support includes a peripheral member extending rearward from the forward wall and a rear member extending inward from the peripheral member, with respect to the front opening. The face support can be combined with a preferred face construction and weight elements to optimize club head performance to help a golfer achieve greater distance and control.

Although the invention has been disclosed in detail with reference only to the preferred embodiments, those skilled in the art will appreciate that additional golf club heads can be included without departing from the scope of the invention. Accordingly, the invention is defined only by the claims set forth below.

We claim:

1. A golf club head, comprising:

a body having a top, a sole, a toe end, a heel end, and a forward wall, the forward wall defining a front opening, the body further having a face support disposed about the front opening, the face support having portions proximate to *at least one of* the top, the toe end, and the heel end, the face support including a peripheral member extending rearward from the forward wall for a length between about 3 mm and 30 mm, measured from a forward surface of the forward wall, the peripheral member having a thickness between about 0.5 mm and 2.5 mm, and a rear member extending inward from the peripheral member, with respect to the front opening, for a length of at least about 2 mm and no more than about 25 mm, the rear member having a thickness between about 0.5 mm and 2.5 mm; and a face plate received by the face support.

2. A golf club head as defined in claim 1, wherein the face support further includes a portion proximate to the sole of the body, the portion proximate to the sole having a rear member extending inward with respect to the front opening and configured to support a lower edge of the face plate.

3. A golf club head as defined in claim 1, wherein the face support further includes a portion proximate to the sole of the body, the portion proximate to the sole having a peripheral member extending rearward from the forward wall for a length between about 3 mm and 30 mm, measured from a forward surface of the forward wall, the peripheral member having a thickness between about 0.5 mm and 2.5 mm, and a rear member extending inward from the peripheral member, with respect to the front opening, for a length of at least about 2 mm and no more than about 25 mm, the rear member having a thickness between about 0.5 mm and 2.5 mm.

4. A golf club head as defined in claim 1, wherein the rear member of the face support is continuous about the front opening, the rear member extending inward from the peripheral member of each of the portions of the face support.

5. A golf club head as defined in claim 1, wherein the peripheral member has a thickness of about 1 mm and a length between about 4 mm and 6 mm, and the rear member has a thickness between about 0.6 mm and 1.5 mm and a length between about 2 mm and 7 mm.

6. A golf club head as defined in claim 1, wherein a junction of the peripheral and rear members of the face support has a maximum thickness of between about 1.5 and 2 mm.

7. A golf club head as defined in claim 1, wherein the rear member tapers from a junction of the peripheral and rear members to an inward end, the inward end having a thickness of between about 0.6 and 0.9 mm.

8. A golf club head as defined in claim 1, wherein the peripheral member is spaced from a skirt of the body at one or both of the toe and heel ends a horizontal distance of at least 1.5 mm measured about 2 mm inward from a side forward surface of the body at the front opening.

9. A golf club head as defined in claim 1, wherein the face support further includes a portion proximate to the sole, the portion proximate to sole having a rear member extending inward with respect to the front opening the portion proximate to sole face disposed such that the front surface of the face plate is substantially flush with the forward wall of the body.

10. A golf club head as defined in claim 9, wherein the portion proximate to the sole further having a peripheral member, the peripheral member extending rearward from the forward wall proximate to the sole for a length between about 3 mm and 30 mm, the peripheral member having a thickness between about 0.5 mm and 2.5 mm, the rear member extending inward from the peripheral member, with respect to the front opening, for a length of at least about 2 mm and no more than about 25 mm, the rear member having a thickness between about 0.5 mm and 2.5 mm.

11. A golf club head as defined in claim 1, wherein the peripheral member is spaced from the top a vertical distance of at least 1 mm measured about 2 mm rearward of an upper forward surface of the body at the front opening.

12. A golf club head as defined in claim 11, wherein the peripheral member is spaced from the sole a vertical distance of at least 1 mm measured about 2 mm rearward of a lower forward surface of the body at the front opening.

[13. A golf club head comprising:

a crown;

a sole;

a skirt disposed between the crown and the sole, the skirt having a toe end and a heel end;

a forward wall coupled to the crown, the sole, and the skirt, the forward wall defining a front opening;

a peripheral member coupled to at least a portion of a periphery of the front opening and extending rearwardly therefrom;

a rear member directly coupled to the peripheral member and extending inwardly therefrom, partially towards a center of the front opening; and a face plate coupled to the rear member.]

[14. The golf club head of claim 13, wherein at least a portion of each of the peripheral member and the rear member is disposed proximate to the crown, the sole, the toe end, or the heel end, or combinations thereof.]

[15. The golf club head of claim 13, wherein the peripheral member extends between about 3 mm and 30 mm from a forward surface of the forward wall.]

[16. The golf club head of claim 15, wherein the peripheral member extends between about 4 mm and 6 mm from a forward surface of the forward wall.]

[17. The golf club head of claim 13, wherein the peripheral member has a thickness between about 0.5 mm and 2.5 mm.]

[18. The golf club head of claim 13, wherein the peripheral member is spaced a first distance of at least 1.5 mm measured in a horizontal direction from the skirt, and wherein the first distance is measured about 2 mm rearward from a side forward surface proximate the front opening.]

[19. The golf club head of claim 13, wherein the peripheral member is spaced a first distance of at least 1 mm measured in a vertical direction from the crown, and wherein the first distance is measured about 2 mm rearward from an upper forward surface proximate the front opening.]

[20. The golf club head of claim 13, wherein the peripheral member is spaced a first distance of at least 1 mm measured in a vertical direction from the sole, and wherein the first distance is measured about 2 mm rearward of a lower forward surface proximate the front opening.]

[21. The golf club head of claim 13, wherein the rear member is continuous about the periphery of the front opening.]

[22. The golf club head of claim 13, wherein the rear member extends between about 2 mm and 25 mm from an inner surface of the peripheral member, relative to the center of the front opening.]

[23. The golf club head of claim 22, wherein the rear member extends between about 2 mm and 7 mm from an inner surface of the peripheral member, relative to the center of the front opening.]

[24. The golf club head of claim 13, wherein the rear member has a thickness between about 0.5 mm and 2.5 mm.]

[25. The golf club head of claim 24, wherein the rear member has a thickness between about 0.6 mm and 1.5 mm.]

*26. The golf club head of claim 1, the face support having portions proximate to the top, the toe end, and the heel end.*

*27. A golf club head comprising:*

*a body;*

*a forward wall defining a front opening;*

*a peripheral member coupled to at least a portion of a periphery of the front opening and extending rearwardly therefrom, the peripheral member being spaced from the body;*

*a rear member directly coupled to the peripheral member and extending inwardly therefrom, partially towards a center of the front opening;*

*a face plate coupled to the rear member;*

*a crown;*

*a sole; and*

*a skirt disposed between the crown and the sole, the skirt having a toe end and a heel end;*

*wherein the forward wall is coupled to the crown, the sole, and the skirt.*

*28. The golf club head of claim 27, wherein at least a portion of each of the peripheral member and the rear member is disposed proximate to the crown, the sole, the toe end, or the heel end, or combinations thereof.*

*29. A golf club head comprising:*

*a body;*

*a forward wall defining a front opening;*

*a peripheral member coupled to at least a portion of a periphery of the front opening and extending rearwardly therefrom, the peripheral member being spaced from the body;*

*a rear member directly coupled to the peripheral member and extending inwardly therefrom, partially towards a center of the front opening;*

*a face plate coupled to the rear member;*

*the rear member having a thickness between about 0.5 mm and 2.5 mm; and*

*wherein the thickness of the rear member tapers inwardly toward a center of the front opening.*

*30. The golf club head of claim 29, wherein an inner end of the rear member has a thickness between about 0.6 mm and 0.9 mm.*

*31. A golf club head comprising:*

*a crown;*

*a sole;*

*a skirt disposed between the crown and the sole, the skirt having a toe end and a heel end;*

*a forward wall coupled to the crown, the sole, and the skirt, the forward wall defining a front opening;*

*a peripheral member coupled to at least a portion of a periphery of the front opening and extending rearwardly therefrom, between about 4 mm and 6 mm from a forward surface of the forward wall, wherein the peripheral member has a thickness between about 0.8 mm and 1.2 mm;*

*a rear member directly coupled to the peripheral member and extending inwardly between about 2 mm and 15 mm from an inner surface of the peripheral member, partially towards a center of the front opening, wherein the rear member has a thickness between about 0.6 mm and 1.5 mm; and*

*a face plate coupled to the rear member.*

*32. The golf club head of claim 31, wherein at least a portion of each of the peripheral member and the rear member is disposed proximate to the crown, the sole, the toe end, or the heel end, or combinations thereof.*

*33. The golf club head of claim 31, wherein the peripheral member is spaced a first distance of at least 1.5 mm measured in a horizontal direction from the skirt, a second distance of at least 1 mm measured in a vertical direction from the crown, and a third distance of at least 1 mm measured in a vertical direction from the sole, and wherein the first distance is measured about 2 mm rearward from a side forward surface proximate the front opening, the second distance is measured about 2 mm rearward from an upper forward surface proximate the front opening, and the third distance is measured about 2 mm rearward of a lower forward surface proximate the front opening.*

*34. The golf club head of claim 31, wherein the rear member is continuous about the periphery of the front opening.*

*35. The golf club head of claim 31, wherein the crown has a thickness between about 0.7 mm and 1 mm.*

*36. The golf club head of claim 31, wherein the skirt has a thickness between about 0.8 mm and 1.2 mm.*

*37. The golf club head of claim 31, wherein the sole has a thickness between about 0.8 mm and 1.2 mm.*

*38. The golf club head of claim 31, wherein the forward wall has a thickness between about 0.8 mm and 1.0 mm.*

*39. The golf club head of claim 31, wherein the crown has a thickness between about 0.7 mm and 1 mm, the skirt has a thickness between about 0.8 mm and 1.2 mm, and the sole has a thickness between about 0.8 mm and 1.2 mm, and the forward wall has a thickness between about 0.8 mm and 1.0 mm.*

*40. The golf club head of claim 31, wherein the face plate is comprised of a composite material.*

*41. The golf club head of claim 40, further comprising a metallic cap covering at least a portion of a striking surface of the face plate.*

*42. The golf club head of claim 40, further comprising a plurality of removable weights coupled to the club head.*

*43. The golf club head of claim 42, wherein first and second removable weights are disposed in a rear region of the club head, a third removable weight is disposed in a toe region of the club head, and a fourth removable weight is disposed in a heel region of the club head.*

*44. The golf club head of claim 40, wherein the golf club head displaces a volume between about 130 $cm^3$ and 460 $cm^3$.*

*45. The golf club head of claim 44, wherein the golf club head displaces a volume of at least about 400 $cm^3$.*

*46. The golf club head of claim 40, wherein the golf club head has a moment of inertia $I_{ZZ}$ of at least 300 kg-$mm^2$.*

*47. The golf club head of claim 46, wherein the golf club head has a moment of inertia $I_{ZZ}$ of at least 350 kg-$mm^2$.*

*48. The golf club head of claim 31, wherein*

*at least a portion of each of the peripheral member and the rear member is disposed proximate to the crown, the sole, the toe end, or the heel end, or combinations thereof;*

*the crown has a thickness between about 0.7 mm and 1 mm, the skirt has a thickness between about 0.8 mm and 1.2 mm, and the sole has a thickness between about 0.8 mm and 1.2 mm, and the forward wall has a thickness between about 0.8 mm and 1.0 mm;*

*the face plate is comprised of a composite material;*

*the golf club head displaces a volume of at least about 400 $cm^3$; and*

*the golf club head has a moment of inertia $I_{ZZ}$ of at least 350 kg-$mm^2$.*

* * * * *

UNITED STATES PATENT AND TRADEMARK OFFICE

CERTIFICATE OF CORRECTION

PATENT NO. : RE42,544 E
APPLICATION NO. : 11/998435
DATED : July 12, 2011
INVENTOR(S) : Bing-Ling Chao et al.

It is certified that error appears in the above-identified patent and that said Letters Patent is hereby corrected as shown below:

Column 1, line 8, above the heading "BACKGROUND OF THE INVENTION" insert --Notice: More than one reissue application has been filed for the reissue of patent 7,140,974. The reissue applications are: (1) the reissue application being filed herewith; and (2) continuation reissue Application No. 13/149,485, filed May 31, 2011.--.

Signed and Sealed this
Twelfth Day of June, 2012

David J. Kappos

David J. Kappos
*Director of the United States Patent and Trademark Office*